(12) United States Patent
Tenorio

(10) Patent No.: US 6,983,276 B2
(45) Date of Patent: Jan. 3, 2006

(54) FACILITATING ELECTRONIC COMMERCE TRANSACTIONS USING BUYER PROFILES

(75) Inventor: Manoel Tenorio, Mountain View, CA (US)

(73) Assignee: i2 Technologies US, Inc., Dallas, TX (US)

(*) Notice: Subject to any disclaimer, the term of this patent is extended or adjusted under 35 U.S.C. 154(b) by 593 days.

(21) Appl. No.: 09/858,269

(22) Filed: May 15, 2001

(65) Prior Publication Data

US 2002/0174089 A1 Nov. 21, 2002

(51) Int. Cl.
*G06F 17/30* (2006.01)

(52) U.S. Cl. .................. 707/7; 707/100; 707/104.1; 707/3

(58) Field of Classification Search .............. 707/3, 707/7, 10, 100, 101, 104.1, 26–27
See application file for complete search history.

(56) References Cited

U.S. PATENT DOCUMENTS

| 3,961,164 | A | 6/1976 | Reed et al. ............. 235/61.12 |
| 5,347,632 | A | 9/1994 | Filepp et al. ............. 395/200 |
| 5,564,043 | A | 10/1996 | Siefert ................. 707/103 R |
| 5,642,419 | A | 6/1997 | Rosen ...................... 705/76 |
| 5,694,546 | A | 12/1997 | Reisman .................... 705/26 |
| 5,721,832 | A | 2/1998 | Westrope et al. .......... 395/227 |

(Continued)

OTHER PUBLICATIONS

AT&L Knowledge Sharing System "Ask a Professor—Question & Answer Detail," 2 pages.
U.S. Appl. No. 09/745,374, filed Dec. 22, 2000, entitled "System and Method for Migrating Data in an Electronic Commerce System," 46 total pages. (.0751).
U.S. Appl. No. 09/745,980, filed Dec. 22, 2000, entitled "System and Method for Selective Database Indexing," 48 total pages. (.0752).
U.S. Appl. No. 09/745,978, filed Dec. 22, 2000, entitled "System and Method for Facilitating Electronic Commerce Transactions," 44 total pages. (.0753).
U.S. Appl. No. 09/746,120, filed Dec. 22, 2000, entitled "System and Method for Identifying a Product," 48 total pages. (.0754).
U.S. Appl. No. 09/858,322, filed May 15, 2001, entitled "Pre-Qualifying Sellers During the Matching Phase of an Electronic Commerce Transaction," 40 total pages (.0839).
U.S. Appl. No. 09/858,269, filed May 15, 2001, entitled "Facilitating Electronic Commerce Transactions Using Buyer Profiles," 41 total pages. (.0842).

(Continued)

*Primary Examiner*—Luke S Wassum
*Assistant Examiner*—Susan Rayyan
(74) *Attorney, Agent, or Firm*—James E. Walton; Brian E. Harris

(57) ABSTRACT

A system (10) for sorting search results according to a buyer profile (47) during the matching phase of an electronic commerce transaction includes a database containing a buyer profile (47) associated with a buyer (20), the buyer profile (47) comprising a record of the number of times each of multiple sort criteria has appeared in at least some previous events involving the buyer (20). A server (40) receives multiple search results communicated from one or more seller databases (32) in response to an under-constrained search query in which exact attribute values are not specified for one or more attributes. The server (40) accesses the buyer profile (47) to determine an order of display based on the number of times one or more sort criteria in the buyer profile (47) applicable to the search results have appeared in the previous events involving the buyer (20). The server (40) sorts the search results according to the determined order of display and communicates the sorted search results to the buyer (20).

26 Claims, 5 Drawing Sheets

U.S. PATENT DOCUMENTS

| | | | |
|---|---|---|---|
| 5,727,129 A | 3/1998 | Barrett et al. | 395/12 |
| 5,790,677 A | 8/1998 | Fox et al. | 705/78 |
| 5,870,473 A | 2/1999 | Boesch et al. | 705/78 |
| 5,918,229 A | 6/1999 | Davis et al. | 707/10 |
| 5,926,797 A | 7/1999 | Goodwin, III | 705/20 |
| 5,935,207 A | 8/1999 | Logue et al. | 709/219 |
| 5,963,134 A | 10/1999 | Bowers et al. | 340/572.1 |
| 5,970,471 A | 10/1999 | Hill | 705/26 |
| 5,987,233 A | 11/1999 | Humphrey | 395/200.47 |
| 6,006,218 A | 12/1999 | Breese et al. | 707/3 |
| 6,049,673 A | 4/2000 | McComb et al. | 717/164 |
| 6,078,891 A | 6/2000 | Riordan et al. | 705/10 |
| 6,105,134 A | 8/2000 | Pinder et al. | 713/170 |
| 6,128,600 A | 10/2000 | Imamura et al. | 705/27 |
| 6,128,624 A | 10/2000 | Papierniak et al. | 707/104 |
| 6,144,996 A | 11/2000 | Starnes et al. | 709/217 |
| 6,154,738 A | 11/2000 | Call | 707/4 |
| 6,189,043 B1 | 2/2001 | Buyukkoc et al. | 709/241 |
| 6,192,131 B1 | 2/2001 | Geer, Jr. et al. | 380/283 |
| 6,199,082 B1 | 3/2001 | Ferrel et al. | 707/522 |
| 6,212,512 B1 | 4/2001 | Barney et al. | 707/1 |
| 6,236,975 B1 | 5/2001 | Boe et al. | 705/7 |
| 6,271,846 B1 | 8/2001 | Martinez et al. | 345/854 |
| 6,285,366 B1 | 9/2001 | Ng et al. | 345/853 |
| 6,286,002 B1 | 9/2001 | Axaopoulos et al. | 707/10 |
| 6,289,382 B1 | 9/2001 | Bowman-Amuah | 709/226 |
| 6,324,522 B2 | 11/2001 | Peterson et al. | 705/28 |
| 6,334,131 B2 | 12/2001 | Chakrabarti et al. | 707/10 |
| 6,336,910 B1 | 1/2002 | Ohta et al. | 604/6.13 |
| 6,341,280 B1 | 1/2002 | Glass et al. | 707/3 |
| 6,343,287 B1 * | 1/2002 | Kumar et al. | 707/4 |
| 6,356,899 B1 | 3/2002 | Chakrabarti et al. | 707/5 |
| 6,366,910 B1 | 4/2002 | Rajaraman et al. | 707/5 |
| 6,370,527 B1 | 4/2002 | Singhal | 707/6 |
| 6,415,320 B1 | 7/2002 | Hess et al. | 709/219 |
| 6,460,038 B1 | 10/2002 | Khan et al. | 707/10 |
| 6,466,240 B1 | 10/2002 | Maslov | 345/853 |
| 6,466,918 B1 * | 10/2002 | Spiegel et al. | 705/27 |
| 6,476,832 B1 | 11/2002 | Park | 345/789 |
| 6,490,567 B1 | 12/2002 | Gregory | 705/39 |
| 6,490,619 B1 | 12/2002 | Byrne et al. | 709/223 |
| 6,532,481 B1 | 3/2003 | Fassett, Jr. | 707/203 |
| 6,553,364 B1 | 4/2003 | Wu | 707/1 |
| 6,581,072 B1 | 6/2003 | Mathur et al. | 707/104.1 |
| 6,591,252 B1 | 7/2003 | Young | 705/67 |
| 6,745,177 B2 | 6/2004 | Kepler et al. | 707/3 |
| 6,778,991 B2 | 8/2004 | Tenorio | 707/10 |
| 2001/0016846 A1 | 8/2001 | Chakrabarti et al. | 707/102 |
| 2001/0032162 A1 * | 10/2001 | Alsberg et al. | 705/37 |
| 2001/0034814 A1 | 10/2001 | Rosenzweig | 711/118 |
| 2001/0044751 A1 * | 11/2001 | Pugliese, II et al. | |
| 2002/0026386 A1 * | 2/2002 | Walden | |
| 2002/0032597 A1 | 3/2002 | Chanos | 705/10 |
| 2002/0046187 A1 * | 4/2002 | Vargas et al. | |
| 2002/0123955 A1 * | 9/2002 | Andreski et al. | |
| 2002/0147704 A1 | 10/2002 | Borchers | 707/3 |
| 2003/0033205 A1 | 2/2003 | Nowers et al. | 705/26 |
| 2003/0167213 A1 | 9/2003 | Jammes et al. | 705/27 |
| 2003/0195877 A1 * | 10/2003 | Ford et al. | |

OTHER PUBLICATIONS

U.S. Appl. No. 09/859,266, filed May 16, 2001, entitled "Facilitating Electronic Commerce Transactions Using a Shared Product Data Repository," 39 total pages. (.0844).

U.S. Appl. No. 09/844,393, filed Jun. 18, 2001, entitled "Distributed Processing of Search Results in an Electronic Commerce System," 47 total pages. (.0846).

U.S. Appl. No. 09/884,007, filed Jun. 18, 2001, entitled "Content Enhancement in an Electronic Marketplace," 44 total pages. (.0849).

U.S. Appl. No. 09/892,300, filed Jun. 26, 2001, entitled "Providing Market Feedback Associated with Electronic Commerce Transactions to Sellers," 43 total pages. (.0840).

U.S. Appl. No. 09/895,654, filed Jun. 28, 2001, entitled "Translation Between Product Classification Schemas," 39 total pages. (.0841).

U.S. Appl. No. 09/895,525, filed Jun. 28, 2001, entitled "Association of Data with a Product Classification Schema," 50 total pages. (.0843).

U.S. Appl. No. 09/895,490, filed Jun. 29, 2001, entitled "Third Party Certification of Content in Electronic Commerce Transactions," 42 total pages. (.0845).

U.S. Appl. No. 09/895,489, filed Jun. 29, 2001, entitled "Protecting Content from Unauthorized Reproduction," 46 total pages. (.0847).

U.S. Appl. No. 09/895,894, filed Jun. 29, 2001, entitled "Protecting Content from Unauthorized Reproduction," 44 total pages. (.0848).

Unknown, "Pars International parleys its sales automation strengths into E–Commerce leadership using Java and IBM SanFrancisco," IBM Press Release Sep. 1998, Pars.com—IBM Press Release Sep. 1998, http://www.pars.com/Ultra/IBMPressRelease.htm, 3 pages, Internet Date May 27, 2003.

Unknown, "ONYX Internet Ltd, The Challenge," eBusiness Innovation Awards 1999, http://www.ecommerce–awards.com/awards2000/winners/1998/finalists/onyx.html, 2 pages, Internet Date May 28, 2003.

Unknown, "eBay—Your Personal Trading Community," http://web.archive.org/web/199900117033159/pages.ebay.com/aw/index.html, About eBay, SafeHarbor, Bookmarks eBay Store, Go Global!, 9 pages (last updated Jan. 16, 1999), Internet date May 28, 2003.

Unknown, "Welcome to Amazon.com," Amazon.com—Earth's Biggest Selection, http://web.archive.org/web/1998013091817/http://amazon.com/, 6 pages, Internet date May 23, 2003.

Unknown, "Northern Light Search," http://web.archive.org/web/19980206192654/http://www.northernlight.com/, 18 pages, Internet date May 28, 2003.

Tracy Marks, "Lesson Two: My Computer and Explorer continued, G. Explorer: Orientation,"Windows 95 Manual, Lesson 2, Using Explorer, Copying Files, http://www.windweaver.com/w95man2g.htm, 4 pages (copyright 1995, '96, '97), Internet date May 23, 2003.

Unknown, "Sample Full Hit Highlighting Form, Query i2 against document /news/1690.asp," Microsoft® Index Server, http://www.industryweek.com/iisamples/issamples/oop/qfullhit.htw?CiWebHitsFile=%2Fnews, 2 pages, Internet Date Dec. 3, 2001.

Unknown, "Sample Full Hit Highlighting Form, Query tradematrix again document /columns/text/689.asp," Microsoft® Index Server, http://www.industryweek.com/iisamples/iisamples/oop/qfullhit.htw?CiWebHitsFile=%2Fcolum, 2 pages, Internet Date Dec. 3, 2001.

PCT, Notification of Transmittal of the International Search Report or the Declaration, 3 pages, Dec. 28, 2001.

PCT, Notification of Transmittal of the International Search Report or the Declaration, 3 pages, Dec. 31, 2001.

Unknown, "website2Go Commerce User Guide, Shopping Cart Online Help," webshop2Go User Guide, http://web.archive.org/web/20000824163512/http://shopguide.website2go.com/, 2 pages, Internet Date May 27, 2003.

Unknown, "1998–1999 Database Seminar Series," Uoft Data Base Group, Database Seminar, http://www.cs.toronto.edu/DB/main/seminars98.html, 4 pages, Internet Date May 27, 2003.

Unknown, "website2Go Commerce User Guide, Shopping Cart Online Help," webshop2Go User Guide, http://web.archive.org/web/20000824163512/http://shopguide.website2go.com/, 2 pages, Internet Date May 14, 2004.

Unknown, "1998–1999 Database Seminar Series," http://www.cs.toronto.edu/DB/main/seminars98.html, 15 pages, Internet Date May 14, 2004.

* cited by examiner

*FIG. 3*

| PID | PRODUCT TYPE | MANUFACTURER | INK COLOR | TIP SIZE | CURRENCIES ACCEPTED | ... | PRICE |
|---|---|---|---|---|---|---|---|
| 23 | BALL POINT | ABC | BLUE | MEDIUM | US DOLLARS | ... | 0.12 |
| 29 | BALL POINT | ABC | BLACK | MEDIUM | US DOLLARS | ... | 0.12 |
| 56 | BALL POINT | XYZ | BLACK | MEDIUM | US DOLLARS | ... | 0.13 |
| 98 | BALL POINT | XYZ | GREEN | MEDIUM | US DOLLARS | ... | 0.13 |
| ... | ... | ... | ... | ... | ... | ... | ... |
| 12 | FELT TIP | XYZ | BLACK | BROAD | US DOLLARS | ... | 0.17 |
| 16 | FELT TIP | ABC | BLACK | BROAD | US DOLLARS | ... | 0.18 |
| 56 | FELT TIP | ABC | RED | FINE | US DOLLARS | ... | 0.16 |
| 123 | FELT TIP | XYZ | RED | FINE | US DOLLARS | ... | 0.16 |
| ... | ... | ... | ... | ... | ... | ... | ... |
| 2 | ROLLER BALL | XYZ | BLUE | FINE | US DOLLARS | ... | 0.25 |
| 59 | ROLLER BALL | XYZ | BLACK | FINE | US DOLLARS | ... | 0.25 |
| 143 | ROLLER BALL | XYZ | BLACK | MEDIUM | US DOLLARS | ... | 0.22 |
| 456 | ROLLER BALL | ABC | RED | EXTRA FINE | US DOLLARS | ... | 0.29 |
| ... | ... | ... | ... | ... | ... | ... | ... |

| PRODUCT CLASS | BALL POINT PENS | BALL POINT PENS | FELT-TIP PENS | FELT-TIP PENS |
|---|---|---|---|---|
| ATTRIBUTE | INK COLOR (12) | TIP SIZE (20) | INK COLOR (17) | TIP SIZE (11) |
| ATTRIBUTE VALUE | BLUE (7) | BROAD (13) | RED (11) | FINE (5) |
| ATTRIBUTE VALUE | BLACK (3) | MEDIUM (3) | BLUE (3) | MEDIUM (4) |
| ATTRIBUTE VALUE | GREEN (1) | FINE (3) | BLACK (2) | BROAD (2) |
| ATTRIBUTE VALUE | RED (1) | EXTRA FINE (1) | GREEN (1) | |

US 6,983,276 B2

FACILITATING ELECTRONIC COMMERCE TRANSACTIONS USING BUYER PROFILES

TECHNICAL FIELD OF THE INVENTION

This invention relates to electronic commerce and more particularly to facilitating electronic commerce transactions using buyer profiles.

BACKGROUND OF THE INVENTION

Due to the ever-increasing popularity and accessibility of the Internet as a medium of communication, the number of business transactions conducted using the Internet is also increasing, as is the number of buyers and sellers participating in electronic marketplaces providing a forum for these transactions. In addition, the globalization of such marketplaces has resulted in an increased number of seller attributes that buyers may need to consider when determining which sellers best suit their needs. The majority of electronic commerce ("e-commerce") transactions occur when a buyer determines a need for a product, identifies a seller that provides that product, and accesses the seller's web site to arrange a purchase of the product. If the buyer does not have a preferred seller or if the buyer is purchasing the product for the first time, the buyer will often perform a search for a number of sellers that offer the product and then access numerous seller web sites to determine which seller offers certain desired product features at the best price and under the best terms for the buyer. The matching phase of an e-commerce transaction (matching the buyer with a particular seller) is often inefficient because of the large amount of searching involved in finding a product and because once a particular product is found, the various offerings of that product by different sellers may not be easily compared.

SUMMARY OF THE INVENTION

According to the present invention, disadvantages and problems associated with the matching phase of e-commerce transactions have been substantially reduced or eliminated.

In one embodiment of the present invention, a system for sorting search results according to a buyer profile during the matching phase of an electronic commerce transaction includes a database containing a buyer profile associated with a buyer, the buyer profile comprising a record of the number of times each of multiple sort criteria has appeared in at least some previous events involving the buyer. A server receives multiple search results communicated from one or more seller databases in response to an under-constrained search query in which exact attribute values are not specified for one or more attributes. The server accesses the buyer profile to determine an order of display based on the number of times one or more sort criteria in the buyer profile applicable to the search results have appeared in the previous events involving the buyer. The server sorts the search results according to the determined order of display and communicates the sorted search results to the buyer.

Particular embodiments of the present invention may provide one or more important technical advantages. Certain embodiments may be used in conjunction with a global content directory that provides a buyer with the ability to search a number of seller databases for a particular product or products. In certain embodiments, search results from one or more seller databases may be sorted according to buyer preferences, which may reflect patterns of buyer behavior over time, facilitating identification of a suitable product and seller by the buyer. Particular embodiments may reduce the amount of time it may take the buyer to identify a suitable product and seller. For example, search results may be sorted according to buyer preferences such that the results most likely to be selected by the buyer may be presented first, which may reduce the number of search results the buyer may have to review before identifying a suitable product and seller (and therefore the amount of time spent reviewing search results). Moreover, certain embodiments may provide for automatic sorting of search results according to buyer preferences when a unique order of display has not been identified (either in a search query or in a sort request), thereby reducing the amount of information a buyer may be required to provide each time a search is requested.

Systems and methods incorporating one or more of these or other technical advantages may be well suited for modern e-commerce environments. Other technical advantages may be readily apparent to those skilled in the art from the following figures, descriptions, and claims.

BRIEF DESCRIPTION OF THE DRAWINGS

To provide a more complete understanding of the present invention and the features and advantages thereof, reference is made to the following description taken in conjunction with the accompanying drawings, in which:

FIG. 3 illustrates an example table within a seller database;

DESCRIPTION OF EXAMPLE EMBODIMENTS

Figure 1:
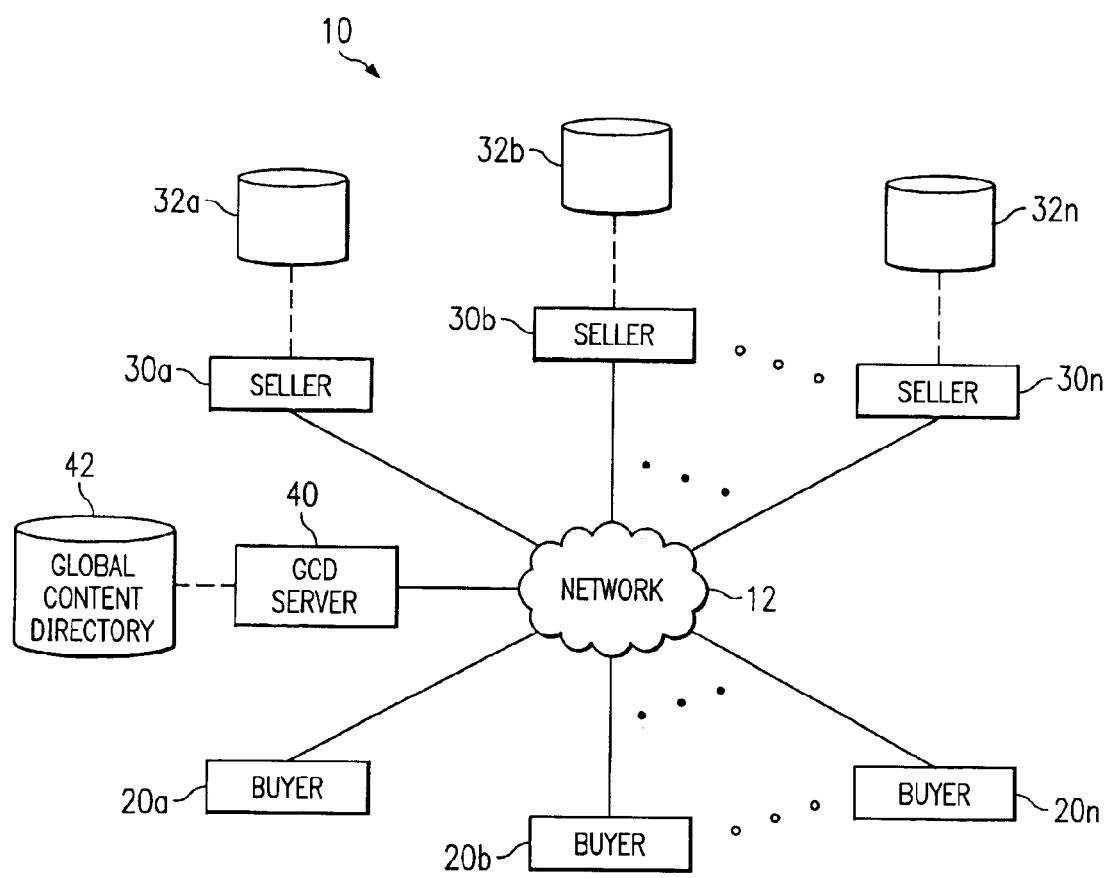
FIG. 1 illustrates an example e-commerce system.

FIG. 1 illustrates an example system 10 that includes a network 12 coupling buyers 20, sellers 30, and a global content directory (GCD) server 40. System 10 enables electronic commerce ("e-commerce") transactions between buyers 20 and sellers 30 through the use of a GCD 42 supported by GCD server 40. GCD 42 may be internal or external to GCD server 40. Network 12 may include any appropriate combination of public and/or private networks coupling buyers 20, sellers 30, and GCD server 40. In an example embodiment, network 12 includes the Internet and any appropriate local area networks (LANs), metropolitan area networks (MANs), or wide area networks (WANs) coupling buyers 20, sellers 30, and GCD server 40 to the Internet. Since the Internet is accessible to the vast majority of buyers 20 and sellers 30 in the world, the present invention potentially includes all of these buyers 20 and sellers 30 as buyers 20 and sellers 30 associated with system 10. However, the use of the term "global" should not be interpreted as a geographic limitation necessarily requiring that GCD 42 provide directory services to buyers 20 and sellers 30 around the world (or from any other particular region) or that the content of GCD 42 be from all over the world (or from any other particular region).

Although buyers 20 and sellers 30 are described as separate entities, a buyer 20 in one transaction may be a seller 30 in another transaction, and vice versa. Moreover, reference to "buyer" or "seller" is meant to include a person, a computer system, an organization, or another entity where appropriate. For example, a buyer 20 may include a computer programmed to autonomously identify a need for a product, search for that product, and buy that product upon identifying a suitable seller. Although buying and selling are primarily described herein, the present invention contemplates any appropriate e-commerce transaction. Moreover, reference to "products" is meant to include goods, real property, services, information, or any other suitable tangible or intangible things.

A typical e-commerce transaction may involve a "matching" phase and a "transactional" phase. During the matching phase, a buyer 20 may search for a suitable product (meaning any good, real property, service, information, or other tangible or intangible thing that may be the subject of an e-commerce transaction) offered by one or more sellers 30, identify the most suitable seller 30 (which may involve, for example, identifying the seller 30 offering the lowest price), and contact that seller 30 to enter the transactional phase. During the transactional phase, buyer 20 and seller 30 may negotiate a contract for the sale of the product (which may involve, for example, more clearly defining the subject of the transaction, negotiating a price, and reaching an agreement on supply logistics) and generate a legal document embodying the terms of the negotiated contract. Sellers 30 may each provide one or more databases 32, such as relational databases, that include product data identifying the products available from sellers 30 and various attributes of the products. Each database 32 may be accessed through the associated seller's web site or in any other appropriate manner.

GCD 42 provides a universal directory of the contents of multiple seller databases 32 (and potentially all seller databases 32). GCD 42 may be implemented using one or more servers 40 or other computers located at one or more locations. Most or all of the content in these seller databases 32 remains stored in databases 32, but all of this content is preferably accessible using GCD 42. Therefore, like the global database described above, GCD 42 provides buyers 20 access to product data relating to a multitude of products, but unlike the global database, GCD 42 does not attempt to store all of this data in one enormous database.

GCD 42 provides a directory of products using a directory structure in which products are organized using a hierarchical classification system. A buyer 20 may navigate or search the directory to find a particular product and product data associated with the product. After a certain point of specificity, the data associated with a product may actually be stored in and obtained by GCD 42 from a seller database 32. However, the requested data may be transparently provided to buyer 20 such that all of the product data may appear to buyer 20 as being included in GCD 42. Although product data has primarily been described as being stored in seller databases 32, the present invention contemplates product data being stored in any suitable manner and being retrieved from any suitable sources. For example, system 10 may include a central database that contains product data that may be combined with product data from one or more seller databases 32.

In addition to product data, GCD 42 may provide buyers 20 access to seller data relating to products available from sellers 30. Reference to "data" is meant to include product data (meaning information reflecting values for certain attributes of a product), seller data (meaning information reflecting values for certain seller attributes), or both product data and seller data, where appropriate. Seller data for a seller 30 may, as described more fully below, provide information regarding seller 30 that may be important to a buyer 20 in choosing to ultimately purchase from or otherwise collaborate with seller 30. Sellers 30 may be described in terms of a supplier ontology that includes fields for seller attribute values, and buyers 20 may electronically search for sellers 30 matching certain seller attribute criteria as well as products matching certain product attribute criteria. Sellers 30 not matching seller attribute criteria provided by a buyer 20 may be excluded from the search results presented to the buyer 20 (or even the search itself), thereby reducing the need for the buyer 20 to individually contact sellers 30 after obtaining the results of a product query or manually cull such results to identify the most suitable seller 30 for buyer 20.

Figure 2:
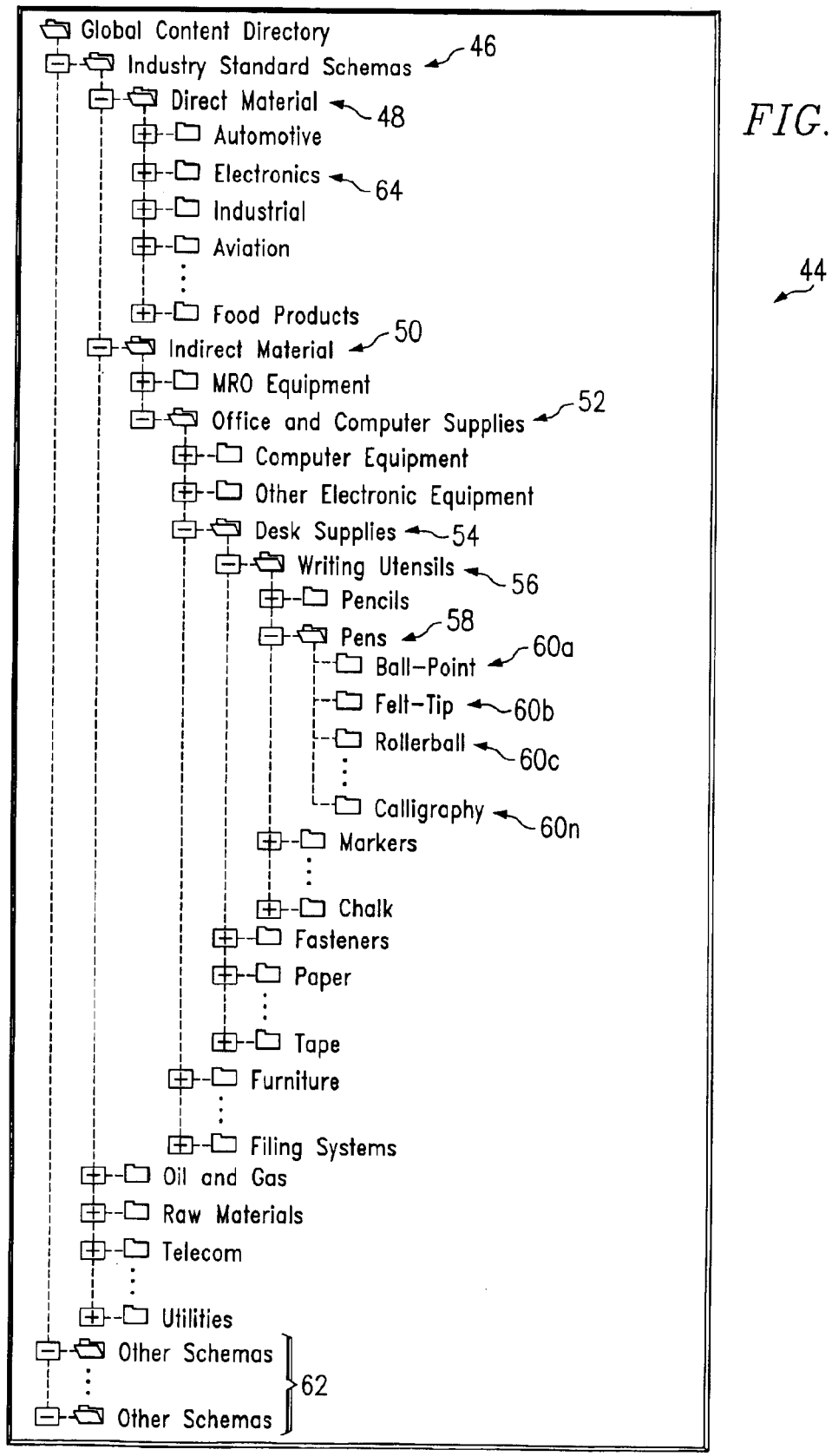
FIG. 2 illustrates an example directory structure of an example global content directory.

FIG. 2 illustrates an example directory structure 44 of an example GCD 42. Products categorized in GCD 42 may be organized according to schemas. A schema may include a set of product classes (which may be referred to as a "taxonomy") organized in a hierarchy, each class being associated with a set of product features, characteristics, or other product attributes (which may be referred to as a "product ontology"). For example, pens may have different kinds of tips (such as ball point or felt tip), different tip sizes (such as fine, medium, or broad), and different ink colors (such as blue, black, or red). Accordingly, a schema may include a class corresponding to pens that has a product ontology including tip type, tip size, and color, or other appropriate attributes. Within a class, products may be defined by product attribute values (such as, for example, ball point, medium tip, blue ink). Reference to value is meant to include any appropriate data reflecting an instance of a product attribute or a seller attribute. Product attribute values and seller attribute values may include numbers, letters, figures, characters, symbols, or other suitable information for describing a product or a seller 30, respectively. In one embodiment, a product ontology may be divided into entry-required attributes (meaning attributes for which a value has to be provided) and entry-optional attributes (meaning attributes for which a value is optional), and these categories may be further divided into commercial features and design features.

In addition to a taxonomy and product ontologies, a schema may include a set of attributes for each seller 30 (which may be referred to as a "seller ontology"). Such attributes may include geographic restrictions (such as served geographic markets), currencies accepted by each seller, collaboration tools accepted by each seller, terms and conditions inherent to each seller, contract terms accepted by each seller, types of contracts accepted by each seller, levels of buyer credit required by each seller, and any other suitable seller attributes. Similar to a products within a product class, sellers 30 offering products within a product class may be defined by seller attribute values corresponding to seller attributes. Accordingly, a schema may include a set of classes, each including one or more products, and each class may be associated with a set of product attributes and a set of seller attributes.

In example directory structure 44, products may be organized and cataloged according to industry standard schemas 46 or other appropriate schemas, as described below. Within industry standard schemas 46, there are two example classes: a direct materials class 48 and an indirect materials class 50. Each of these classes 48 and 50, includes several sub-classes (which may themselves include sub-classes). Therefore, the numerous classes of directory structure 44 form a "tree-like" hierarchical structure into which products may be categorized. For example purposes, certain portions of directory structure 44 are "expanded" in FIG. 2 to show various levels of classes. The "level" of a class is indicated by the number of other classes between that class and a root class (such as industry standard schemas class 46). For example, indirect material class 50 is at the same level in directory structure as direct material class 48. Indirect material class 50 may include an office and computer supplies class 52, which includes a desk supplies class 54, which includes a writing utensils class 56. Furthermore, writing utensils class 56 includes a pens class 58, which includes numerous pen type classes 60a–60n ("n" indicating that any number of classes 60 may be included in pens class 58). Each of classes 50, 52, 54, 56, 58, and 60 is located at a different level of directory structure 44. A class at any level in directory structure 44 may include one or more subclasses, those sub-classes may include one or more subclasses, and so on until a desired specificity of categorization is reached. A series of classes from a highest level class (the broadest class) to a lowest level class (the most specific class) may be referred to as a "branch" of directory structure 44. For example, classes 46, 48, 50, 52, 54, 56, 58, and 60b form one branch of directory structure 44.

Although example directory structure 44 may use industry standard schemas 46 as described above, any other appropriate schemas 62 may be used in addition to or instead of industry standard schemas 46. For example, while industry standard schemas 46 may be organized from a seller's viewpoint, other schemas 62 may be used that organize products from a buyer's viewpoint. For example, a buyer 20 may wish to furnish a kitchen of a new house with various products, such as appliances, window treatments, paint, cabinetry, plumbing, dishes, and cooking utensils. Using one schema 62, these products may be organized into a variety of unrelated classes based on certain features of the products (for example, certain kitchen appliances may be categorized in an electronics class 52 of directory structure 44 while paint may be categorized into an industrial class 52). However, another example schema 62 may categorize all such products into a home products class (which may include several classes further categorizing the products, such as a kitchen products class which includes a kitchen appliances class, which includes a refrigerator class, and so on). As another example, a hospital supplies schema 62 may include a set of product classes corresponding to different hospital facilities, allowing a hospital supplies buyer to search for products typically associated with emergency rooms in one product class and products typically associated with intensive care units in another. Therefore, the same product may be included in multiple schemas 62. These alternative schemas may be included in directory structure 44 and may be stored as a part of or separate from GCD 42.

A buyer 20 may navigate through directory structure 44 by expanding or collapsing various classes as desired. For example, FIG. 2 illustrates an expansion of certain classes of directory structure 44 to reach a felt-tip pen class 60b. Once a buyer 20 has navigated to a class that is specific enough for buyer 20 (and/or a class that is at the end of a branch), buyer 20 may perform a search for products within that class. For example, buyer 20 can search for all products in writing utensils class 56 that are blue felt-tip pins having medium tips. Alternatively, if buyer 20 navigates to the end of a branch of directory structure 44, such as felt-tip pen class 60b, GCD 42 may then enable buyer 20 to search for such pens that have blue ink and medium tips (which may reach the same result as the search above).

Buyer 20 may also search for sellers 30 matching one or more seller attribute values within a product class. For example, in addition to searching for all products in writing utensils class 56 that are blue felt-tip pins having medium tips, buyer 20 may search for sellers 30 serving Texas that accept U.S. dollars. Buyer 20 may search for products matching certain product attribute values and sellers 30 matching certain seller attribute values in any appropriate manner. In one embodiment, for example, buyer 20 provides search criteria including both criteria for product attributes and for seller attributes (search criteria may instead be generated automatically, in whole or in part, as described below), and server 40 searches for products that match the product attribute criteria and are offered by sellers 30 matching the seller attribute criteria. (Where appropriate, "criteria" and "values" may be used interchangeably herein.) Alternatively, server 40 may search for sellers 30 matching the seller attribute criteria, "deselect" those databases 32 corresponding to sellers 30 not matching the criteria, and then search those databases 32 that have not been deselected for products matching the product attribute criteria. In another embodiment, buyer 20 provides only product attribute criteria, and server 40 limits its search for products matching the product attribute criteria to databases 32 associated with sellers 30 known to match seller attribute criteria that buyer 20 may want, according to a buyer profile or otherwise. As described more fully below, server 40 may determine whether a seller 30 matches such criteria by accessing a buyer profile that contains a record of prequalified sellers 30 for buyer 20.

In one embodiment, as described above, product data (at least product data more detailed than data provided by a taxonomy) and seller data are not stored in GCD 42, but are stored in databases 32. For example, a seller 30 may maintain a relational database 32 that includes a plurality of tables containing product attribute values for a variety of products and attribute values for seller 30 for each product, a set of products, or all of the products offered by seller 30. Product data and seller data may be integrated into one or more tables or may be segregated into different tables. Moreover, product data and seller data for a seller 30 may be stored in the same or separate databases. For example, as described above, product data for seller 30 may be stored in seller database 32 while seller data for seller 30 may be stored in a central database accessible to server 40 that may contain seller data for a number of sellers 30. One or more pointers may be associated with each class to identify the location of one or more databases 32 that include product data and/or seller data for products contained in that class or to identify particular data in databases 32. Therefore, GCD 42 may execute a search for products in databases 32 identified by a pointer corresponding to a user-selected class (the class may instead be selected automatically in an appropriate manner). GCD 42 may also return the network location (such as a uniform resource locator (URL) or other network address) of the database 32 to buyer 20 so that buyer 20 may independently access database 32. Databases 32 may be searched using any appropriate method including, but not limited to, a structured query language (SQL) query.

GCD 42 may be implemented using the lightweight directory access protocol (LDAP), which enables directories to be provided using the tree-like structure described above. However, any other appropriate technique or protocol for creating GCD 42 may alternatively be used and GCD 42 may have any appropriate structure. Furthermore, GCD 42 may be an object-oriented directory (which is also provided by LDAP) such that each class in directory structure 44 includes the attributes of parent classes in which the class is a sub-class. In this embodiment, a product class listed at the end of a branch of the tree structure includes all of the attributes of its parent classes in the branch. Furthermore, each product included in a database 32 may be an object that includes all the attributes of the classes in which the product is included. Thus, when a search is performed from a class at the end of a branch of directory structure 44, the search query may automatically include any appropriate attributes of parent classes of the class.

For example, if a buyer 20 has navigated through directory structure 44 to felt-tip pens class 60*b*, a search performed by buyer 20 (or by GCD 42 on behalf of buyer 20) from felt-tip pens class 60*b* may automatically be limited to a search for felt-tip pens and buyer 20 may introduce additional desired search criteria (such as blue ink and medium tip). Therefore, if a database 32 searched includes product data relating to a variety of writing utensils, a search of database 32 may be automatically limited by GCD 42 to only include felt-tip pens within that database 32. Buyer 20 may also identify additional product attribute values and/or seller attribute values as additional search criteria.

When GCD 42 has performed a search of the databases 32 identified by a pointer or pointers associated with a class that buyer 20 has selected (or that has been selected automatically), GCD 42 may return product data and possibly seller data associated with one or more products matching the search criteria. (Alternatively, search results may be communicated directly to buyer 20 from databases 32.) GCD 42 may integrate the product data and possibly seller data resulting from the search into directory structure 44 so that the data appears to buyer 20 as being part of GCD 42. GCD 42 may alternatively present the results of the search in any other appropriate manner. Each product resulting from the search may be an object which is unique instance of the class in which buyer 20 is searching. Furthermore, each such object (and its location) may be uniquely identified using a numbering scheme corresponding to directory structure 44.

In summary, a buyer 20 may search for a product matching certain product attribute values available from a seller 30 matching certain seller attribute values using GCD 42 and thus eliminate or reduce the need for buyer 20 to individually search numerous seller databases 32 to find the desired product available from a suitable seller. GCD 42 provides access to product and seller data relating to these numerous products using directory structure 44, which organizes products using a hierarchical, object-oriented classification system. Buyer 20 may navigate or search directory structure 44 to find a particular classification of products and various information associated with the products within this classification, initiate a search of databases 32 including product and seller data relating to a product, and then communicate with an appropriate database 32 through GCD server 40 or otherwise. Such access to vast numbers of products is provided without the requirement that all data about the products and associated sellers 30 be stored in a global database (which would greatly decrease performance). Instead, this data may be stored in seller databases 32 that can be readily accessed from GCD 42.

One problem that may be associated with the use of various seller databases 32 is that databases 32 may include product data about the same class of product (for example, felt-tip pens), but may identify products of that class using different attribute values, may use different names for the same product attribute value, and/or may quantify or distinguish product attribute values differently (using different units of measurement, for example). The same may be true for seller data that may be contained in databases 32. Some of these issues may be solved using translation mechanisms that convert the data into a uniform format used by GCD 42. In addition, sellers 30 may create a database 32 (or modify an existing database 32) to conform to a uniform standard in anticipation of database 32 being used in association with GCD 42. If a database 32 does not completely conform to such a uniform standard, the database 32 may be partially integrated into GCD 42, but some products in the database 32 may not be properly identified and presented to a buyer 20 using GCD 42. Therefore, through translation mechanisms and market pressure to be included and fully integrated into a global directory of products, seller databases 32 may conform to the uniform standard used by GCD 42 to identify the particular class or classes of products included in the databases 32.

FIG. 3 illustrates an example table 150 that may be included in a seller database 32. Database 32 may include one or more tables 150, and each table 150 may contain data relating to one or more products. For example, example table 150 includes data relating to different types of pens. Table 150 may also include data for other types of products (for example, other types of office supplies), or such data may be contained in other tables 150 in database 32. Table 150 includes a plurality of columns 152 that each include data relating to a particular product attribute or seller attribute. Although an example number of columns 152 including example product attribute values and seller attribute values are illustrated, it should be understood that any appropriate number and type of product attributes, seller attributes, or other categories of data may be included in table 150. Moreover, as described briefly above, seller data and product data may be segregated into different tables instead of being integrated into the same table as shown in example table 150.

Table 150 also includes a number of rows 154 that may each correspond to a particular product and that each include values for one or more of the product attributes and seller attributes. Each of the values (which may be numeric, textual, or in any other appropriate format, as described above) is located at the intersection of the row 154 associated with a particular product and the column 152 that includes a particular product attribute or seller attribute. Each of these intersections may be referred to as a field or cell 156 of table 150. Where seller data and product data are integrated, each row 154 may contain all of the product data and seller data for the product corresponding to that row 154. Alternatively, there may be a row or set of rows dedicated to seller data that may apply to all products offered by a seller 30 or a subset of all such products. Where seller data and product data are segregated, each row in the seller data table may correspond to a set of seller attribute values that may be linked to a set of one or more products in the product data table such that seller data for a product may be accessed when product data for that product is accessed, and vice versa.

The data in one or more columns 152 of table 150 may be indexed to increase the speed with which database reads may be conducted. For example, the fields 156 of ink color column 152*d* and tip size column 152*e* may be indexed so that a database query for a pen having a particular ink color and tip size may be quickly performed. Data in table 150 may be indexed using any appropriate database indexing technique. The typical result of such indexing is that when GCD server 40 or a buyer 20 requests indexed data from a database 32, the associated database management system (or other appropriate interface to database 32) does not have to search through every field 156 in the tables 150 included in database 32 to locate the requested data. Instead, the data may be indexed such that when a query is submitted for products matching certain product attribute values available from sellers 30 matching certain seller attribute values that have been indexed, the database management system already knows the locations of such products in table 150 and may return data associated with these products without searching the entire table 150 or database 32 for the products. For example, if the ink color fields 156 and tip size fields 156 of columns 152d and 152e, respectively, are indexed, the index will typically identify the location of all products having black ink and a medium tip size.

If a query is submitted that also specifies certain values of one or more non-indexed product attributes (for example, a query for pens manufactured by ABC Company, if the manufacturer fields 156 in column 152c are not indexed) and/or seller attributes, then the associated database management system may perform a search of database 32 for products that include the specified values of the non-indexed product attributes and/or seller attributes. However, such a search may be limited to the products already identified (using the index) as including specified values of indexed attributes (for example, pens having black ink and a medium tip) and/or seller attributes that are also included in the search. Therefore, the amount of time required to perform the search may be reduced even though one or more of the product attribute values or seller attribute values that are searched for are not indexed.

Figures 4, 5:
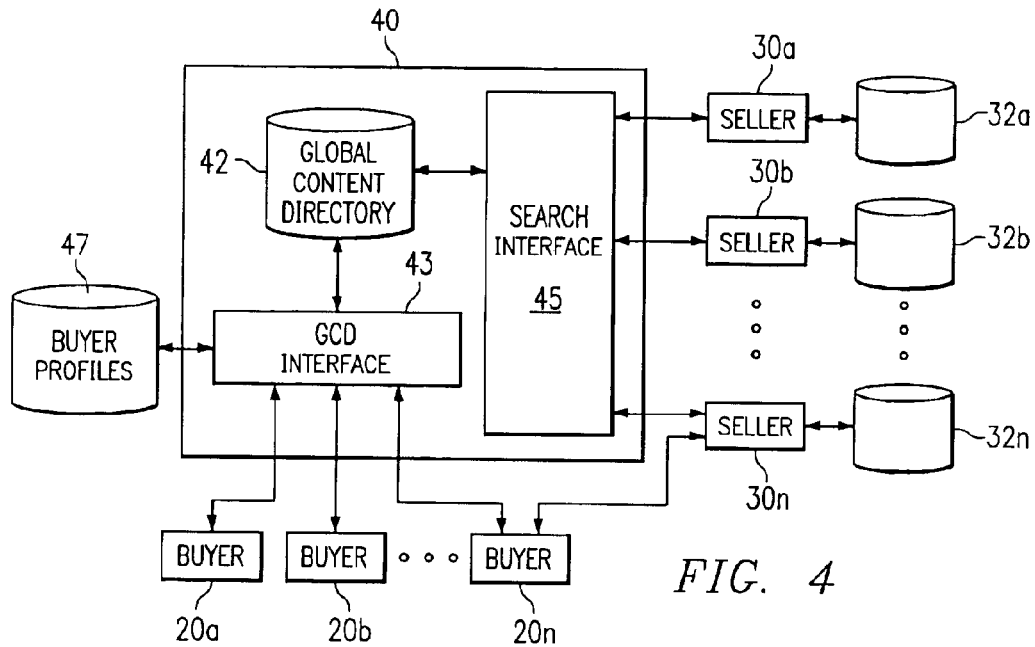
FIG. 4 illustrates an example e-commerce system in further detail.
FIG. 5 illustrates an example portion of a table containing buyer preferences.

FIG. 4 illustrates an example e-commerce system 10 in further detail. As described above, numerous buyers 20 and sellers 30 may be coupled to GCD server 40 using network 12. Buyers 20 may access server 40 using a web browser or in any other appropriate manner and server 40 may provide buyers 20 with access to GCD 42 using a web server or in any other appropriate manner. Although GCD 42 is shown as being internal to GCD server 40, GCD 42 may be internal or external to GCD server 40, as described above. GCD server 40 may also include hardware and/or software for implementing one or more GCD interfaces 43. A buyer 20 may access server 40 and use a GCD interface 43 to search or navigate GCD 42 and/or seller databases 32. Information may be communicated between buyers 20, sellers 30, and GCD 42 using hypertext transport protocol (HTTP), extensible markup language (XML), simple object access protocol (SOAP), or any other suitable communication technique. Each buyer 20 and seller 30 may be issued a unique identifier so that the participants in a transaction facilitated by GCD 42 may be identified. Each buyer 20 and seller 30 may also be assigned a role with respect to a transaction. As described above, a buyer 20 in one transaction may be a seller 30 in another transaction, and vice versa.

In an example transaction, a buyer 20 may access a GCD interface 43 and perform a search of GCD 42. GCD interface 43 may allow buyer 20 to both navigate or "browse" the classes of GCD 42 and to search for a particular class or classes. For example, buyer 20 may either navigate GCD 42 to find a class into which pens are categorized or buyer 20 may search GCD 42 for class names including the word "pen." Any other suitable methods for identifying a particular class may also be used. When buyer 20 has located the appropriate class for the product buyer 20 desires, buyer 20 may then request a listing of products in that class matching certain product attribute values available from sellers 30 matching certain seller attribute values. For example, if buyer 20 is browsing felt-tip pens class 60b, buyer 20 may request all products in class 60b (felt-tip pens) that have red ink and a fine tip and that are sold by a seller 30 located in the United States.

A search interface 45, or any other appropriate component of GCD server 40, may facilitate such a request by searching or requesting searches of seller databases 32 identified by one or more pointers associated with felt-tip pens class 60b, as described above. Search interface 45 may provide buyer 20 a search form in which to enter one or more search criteria. The types of search criteria that may be used may be identified in the search form or buyer 20 may be allowed to perform a general search of databases 32 for certain terms. For example, search interface 45 may provide buyer 20 with a search form tailored for class 60b that includes fields where buyer 20 can specify a desired ink color, tip thickness, or any other appropriate product-related or seller-related criteria. In one embodiment, the fields of the search form correspond to some or all of the product attributes within the product ontology and some or all of the seller attributes within the seller ontology corresponding to the product class that has been selected, and buyer 20 may enter values for the product attributes and seller attributes in the corresponding search form fields. In lieu of a search form, search interface 45 may instead provide a single field where buyer 20 can enter in desired search terms, such as "red" and "fine" (multiple search terms may be entered using Boolean operators or any other appropriate technique).

Search interface 45, or any other appropriate component of GCD server 40, may also facilitate search requests by accessing a buyer profile 47 for buyer 20 containing information compiled from previous search requests made by buyer 20 or previous e-commerce transactions involving buyer 20. Such information may also be provided by buyer 20 specifically for creating or updating profile 47 associated with buyer 20. For example, buyer profile 47 may contain a list of sellers 30 matching seller attribute values that buyer 20 may want. Such a list may be compiled from the results of previous searches by buyer 20. Buyer profiles 47 may be stored in one or more databases at one or more locations integral to or separate from server 40. Although databases are primarily described, buyer profiles 47 may be stored using any suitable data storage arrangement. Search interface 45 may access the profile 47 associated with buyer 20 for any suitable purpose. In one embodiment, search interface 45 may access profile 47 associated with buyer 20 to facilitate selection of a product class for buyer 20. For example, profile 47 may indicate what products buyer 20 may want to purchase at certain times (daily, weekly, monthly, yearly, etc.) and select the appropriate product class for buyer 20 or suggest or otherwise direct buyer 20 to that product class. Profile 47 may also indicate what product classes buyer 20 typically searches or purchases products from. In this case, search interface 45 may present buyer 20 a list of frequently searched classes from which buyer 20 may select a class or, alternatively, select a class automatically for buyer 20 based on profile 47 for buyer 20. In another embodiment, search interface 45 may access profile 47 associated with buyer 20 to automatically generate search criteria, such as product attribute values and seller attribute values, for a search.

Furthermore, search interface 45 may access profile 47 associated with buyer 20 to limit its search for products matching product attribute values provided by buyer 20 (or generated automatically) to databases 32 associated with sellers 30 known to match seller attribute values that buyer 20 may want. For example, buyer 20 may provide search criteria including product attribute values, and search interface 45 may access the seller list in profile 47 for buyer 20 to limit its search for products matching those attribute values to databases 32 associated with sellers 30 appearing on the list. In this way, profile 47 may provide a "private" catalog for buyer 20, pointing to databases 32 associated with sellers 30 with which buyer 20 may collaborate. In addition to accessing buyer profiles 47 to retrieve information, search interface 45 or other appropriate components of GCD server 40 may also access a buyer profile 47 associated with a buyer 20 to store information from previous search requests made by buyer 20, previous e-commerce transactions involving buyer 20, or other events on the part of buyer 20. GCD server 40 may store such information automatically or in response to a request from buyer 20.

Based on search criteria provided by buyer 20 or generated automatically (and possibly based on any appropriate attributes of the class from which the search is conducted), search interface 45 may communicate a query to one or more appropriate seller databases 32 requesting that databases 32 each return a listing of all products (including associated product data and seller data) that meet the search criteria. Databases 32 may also return data relating to attribute values that were not included in the search criteria. For example, databases 32 may return a price and availability of products that meet the search criteria even if price and availability were not search criteria.

Search results (meaning the responses to the queries of databases 32) may be presented to buyer 20 in any appropriate manner. In one embodiment, GCD interface 43 may sort search results before presenting them to buyer 20 to assist identification of a suitable seller 30 by buyer 20. For example, GCD interface 43 may sort search results according to one or more buyer preferences for buyer 20. Buyer preferences may include product attributes, product attribute values, seller attributes, seller attribute values, and any other criteria that may be used to sort search results. Buyer preferences for a buyer 20 may be generated in association with events in which buyer 20 specifies a product attribute, product attribute value, seller attribute, seller attribute value, or other criteria that may be used to sort search results. Such events may include, but are not limited to, search queries, sort requests, and search result selections. For example, a search query may specify one or more attribute values as search criteria. These search criteria may be stored (as described more fully below) as buyer preferences. Similarly, in connection with a search request or after search results are returned, a sort request may rank values for one or more attributes to specify sort criteria, and these sort criteria may be stored as buyer preferences. Moreover, when search results are presented to a buyer 20, buyer 20 may select one of the search results to purchase a product, to contact the seller 30 of a product, or for another suitable purpose, and the attribute values associated with the selected search result may be stored as buyer preferences.

Buyer preferences may be recorded in buyer profiles 47. As described above with reference to automatically generating search criteria and/or selecting product classes, buyer profiles 47 may be stored in one or more databases at one or more locations integral to or separate from server 40. Although databases are primarily described, buyer profiles 47 may be stored using any suitable data storage arrangement. Within a buyer profile 47 for a buyer, there may be one or more tables containing the buyer preferences for buyer 20. FIG. 5 illustrates an example portion 64 of a table containing buyer preferences. Within a table, there may be one or more columns 66, each associated with a different attribute and product class. For example, a table may include column 66*a* for the attribute "ink color" for the product class "ball-point pens" and column 66*c* for the attribute "ink color" for the product class "felt-tip pens." Each column 66 may include one or more fields, each associated with a different value for the corresponding attribute and containing a count representing the number of times the attribute value has appeared in a search request as a search criterion, in a sort request as a sort criterion, in a selected search result, or otherwise in connection with the interaction of buyer 20 with GCD server 40. The count may be compiled over a specified period of time or over a specified number of recent such events. For example, in portion 64 of a table in a buyer profile 47, field 68 corresponds to the attribute value "blue" for the attribute "ink color" and the product class "ball-point pens" and includes count 70 indicating that the attribute value "blue" for the attribute "ink color" and the product class "ball-point pens" has appeared in seven events involving the buyer 20 over a specified period of time or a specified number of recent events.

Each column 66 may also include a field containing a count representing the number of times the attribute associated with the column 66 has appeared in an event. For example, in portion 64 of a table in a buyer profile 47, field 72 contains count 74 indicating that the attribute "tip size" for the product class "ball-point pens" has appeared in twenty events involving the buyer 20 over a specified period of time or a specified number of recent events. Different tables within a buyer profile 47 may contain buyer preferences generated by different types of events. For example, there may be one table for buyer preferences generated by search queries, another table for buyer preferences generated by sort requests, another table for buyer preferences generated by search result selections, and so on. Alternatively, buyer preferences generated by different types of events may be integrated into a single table. A "moving window" may be applied to the stored buyer preferences for a buyer 20. A preference that has not appeared in a certain number of recent events (or in a certain number of events during a given period of time) may be removed from the one or more tables containing it. Before a preference is removed, GCD interface 43 (or another suitable component of server 40) may notify buyer 20 and give buyer 20 an opportunity to override the moving window and maintain that particular preference within the buyer profile 47.

When an event involving buyer 20 occurs, the buyer preferences generated by the event are recorded in buyer profile 47 for buyer 20 by modifying the appropriate table to reflect the appearance of the preferences in the event. For example, when a search query specifies an attribute value for which a field has already been allocated in the appropriate column 66, the counts for that attribute value and the associated attribute may be incremented to reflect the appearance of the corresponding buyer preference. When a search query specifies an attribute value for which a field has not already been allocated in the appropriate column 66, a field may be allocated for that attribute value within column 66, a count initiated for the attribute value, and the count incremented for the associated attribute. When a search query specifies an attribute value and no column 66 has yet been allocated for the associated attribute, a column 66 may be allocated for that attribute, fields may be allocated within the column 66 for that attribute value and the associated attribute, and counts initiated for that attribute value and the associated attribute. Buyer preferences generated by sort requests, search result selections, or other events may be handled analogously. In one embodiment, the amount by which a count for an attribute or an attribute value is incremented may depend on the type of event that generated the buyer preference being recorded. For example, the count for an attribute value may be incremented by one when the attribute value appears in a sort request and incremented by two when the same attribute value appears in a search result selection. In this way, different events may be "weighted" differently for purposes of incrementing counts associated with attributes and attribute values.

When search results are received by GCD interface 43 from seller databases 32, GCD interface 43 may determine whether to sort the search results before presenting them to buyer 20. GCD interface 43 may sort search results when, for example, they are under-constrained as to one or more attributes in that an exact value has not been specified in the search query for one or more attributes associated with the search results. For example, returned search results may be under-constrained where a product class has a product ontology that includes five attributes and the search query specifies only four attribute values. As another example, returned search results may also be under-constrained where a product class has a product ontology that includes five attributes and the search query specifies four exact attribute values and specifies one inexact attribute value (such as "greater than 0.5") that may be "matched" by a number of different values. Either of the cases may be referred to as involving lack of an exact value being specified for one or more attributes. The search results may in such cases be sorted based on attribute values for the one or more under-constrained attributes. GCD interface 43 may not sort search results when the search results are fully constrained or so few search results are returned that sorting the results would be of little benefit in selecting the most suitable product and seller.

When the search results are under-constrained as a result of there being one attribute associated with the search results for which an exact value was not specified in the search query, GCD interface 43 may determine an order of display by accessing the column 66 corresponding to that attribute in the appropriate table in the buyer profile 47 for buyer 20. In one embodiment, GCD interface 43 sorts the search results according to the count for each attribute value in the column 66. Products matching the attribute value having the highest count may be listed first, products matching the attribute value having the next highest count may be listed second, and so on. Additionally, buyer 20 may provide one or more search-specific sort criteria by ranking values for one or more attributes that may take precedence over buyer preferences in sorting the search results.

When the search results are under-constrained as a result of there being more than one attribute associated with the search results for which an exact value was not specified, GCD interface 43 may rank the attributes for which values were not specified to determine the order in which the search results are to be sorted. For example, when exact values have not been specified for three attributes associated with the search results, GCD interface 43 may rank the three attributes such that the search results are listed first by the high-ranking attribute, then by the middle-ranking attribute, and then by the low-ranking attribute. GCD interface 43 may accordingly sort the search results first by the low-ranking attribute (using the method of sorting according to attribute values described above, for example), then by the middle-ranking attribute, and then by the high-ranking attribute. In this way, the highest ranking attribute may "dominate" the sort. Additionally, buyer 20 may provide one or more search-specific sort criteria by ranking values for one or more attributes that may take precedence over buyer preferences in sorting the search results.

In one embodiment, GCD interface 43 may rank attributes according to the count for the leading attribute value (the value having the highest count of all values for that attribute) for each attribute to be ranked. The attribute with its leading attribute value having the highest count may be ranked first, the attribute with its leading attribute value having the next highest count may be ranked second, and so on. GCD interface 43 may determine the count for the leading attribute value for an attribute by accessing the column 66 corresponding to that attribute in the appropriate table in buyer profile 47 for buyer 20. GCD interface 43 may rank attributes according to the count for each attribute. The attribute having the highest count may be ranked first, the attribute having the next highest count may be ranked second, and so on. GCD interface 43 may determine the count for an attribute by accessing the column 66 corresponding to that attribute in the appropriate table in buyer profile 47 for buyer 20. If there is no count for an attribute, GCD interface 43 may determine the count for an attribute by adding together the attribute value counts within its column 66. Although two alternative methods of ranking attributes have been primarily described, GCD interface 43 may rank attributes in any appropriate manner. Moreover, GCD interface 43 may be able to rank attributes using multiple techniques. Where there is more than one method available for ranking attributes, GCD interface 43 may determine which method to use by applying a suitable algorithm. For example, if GCD interface 43 may use either of the methods described above for ranking attributes to determine an order of display, GCD interface 43 may use the method that produces the greatest count difference between attributes. Furthermore, although certain techniques for determining one or more attributes that may be used to sort search results have been described, any other appropriate techniques may be used.

Upon identifying a suitable product and seller 30 from among the search results communicated from GCD server 40, buyer 20 may select a product from the product listing to indicate a desire to initiate a transaction regarding the product, such as a purchase of the product. On such a selection, GCD 42 may communicate a repository identifier (RID) identifying the selected seller 30 and a globally unique identifier (GUID) for the product to buyer 20. For example, an RID may be the network address (such as an IP address) of a seller network node 30 or may be associated with the network address in a table (in which case GCD 42 may use the RID to look up the associated network address and then communicate the network address to buyer 20). Buyer 20 may access the seller 30 using the RID (or network address) and request a transaction regarding the product using the GUID. GCD 42 may even provide a link including a URL of a web site associated with the seller 30 or may provide another appropriate method for buyer 20 to be connected to seller 30. Although only a single example arrow (between buyer 20n and seller 30n) is shown to illustrate communication between buyers 20 and sellers 30, it should be understood that any buyer 20 may communicate with any seller 30 to conduct appropriate transactions.

Since GCD 42 is able to communicate, in particular embodiments, with databases 32 to identify certain products requested by a buyer 20, product data and/or seller data categorized in GCD 42 does not have to be stored at GCD 42. Furthermore, since buyer 20 may communicate directly with an appropriate seller 30 after selecting a product identified by GCD 42 and being given location information for a seller 30 of the product, GCD 42 does not, in certain embodiments, have to maintain resources to support transactions relating to the product. Therefore, by linking a directory of products to databases 32 containing information about the products, potentially every product in the world may be made available to a buyer 20 without having to centrally store information about all such products (which would be infeasible due to the immense amount of data that would have to be stored, the difficulties associated with keeping the data up to date, and other problems).

Moreover, in certain embodiments, search results from one or more seller databases 32 may be sorted according to buyer preferences, which may reflect patterns of buyer 20 behavior over time, facilitating identification of a suitable product and seller 30 by the buyer. Particular embodiments may reduce the amount of time it may take the buyer 20 to identify a suitable product and seller. For example, search results may be sorted according to buyer preferences such that the results most likely to be selected by the buyer 20 may be presented first, which may reduce the number of search results the buyer 20 may have to review before identifying a suitable product and seller 30 (and therefore the amount of time spent reviewing search results). Certain embodiments may also provide for automatic sorting of search results according to buyer preferences when a unique order of display has not been identified (either in a search query or in a sort request), thereby reducing the amount of information a buyer 20 may be required to provide each time a search is requested.

Figure 6:
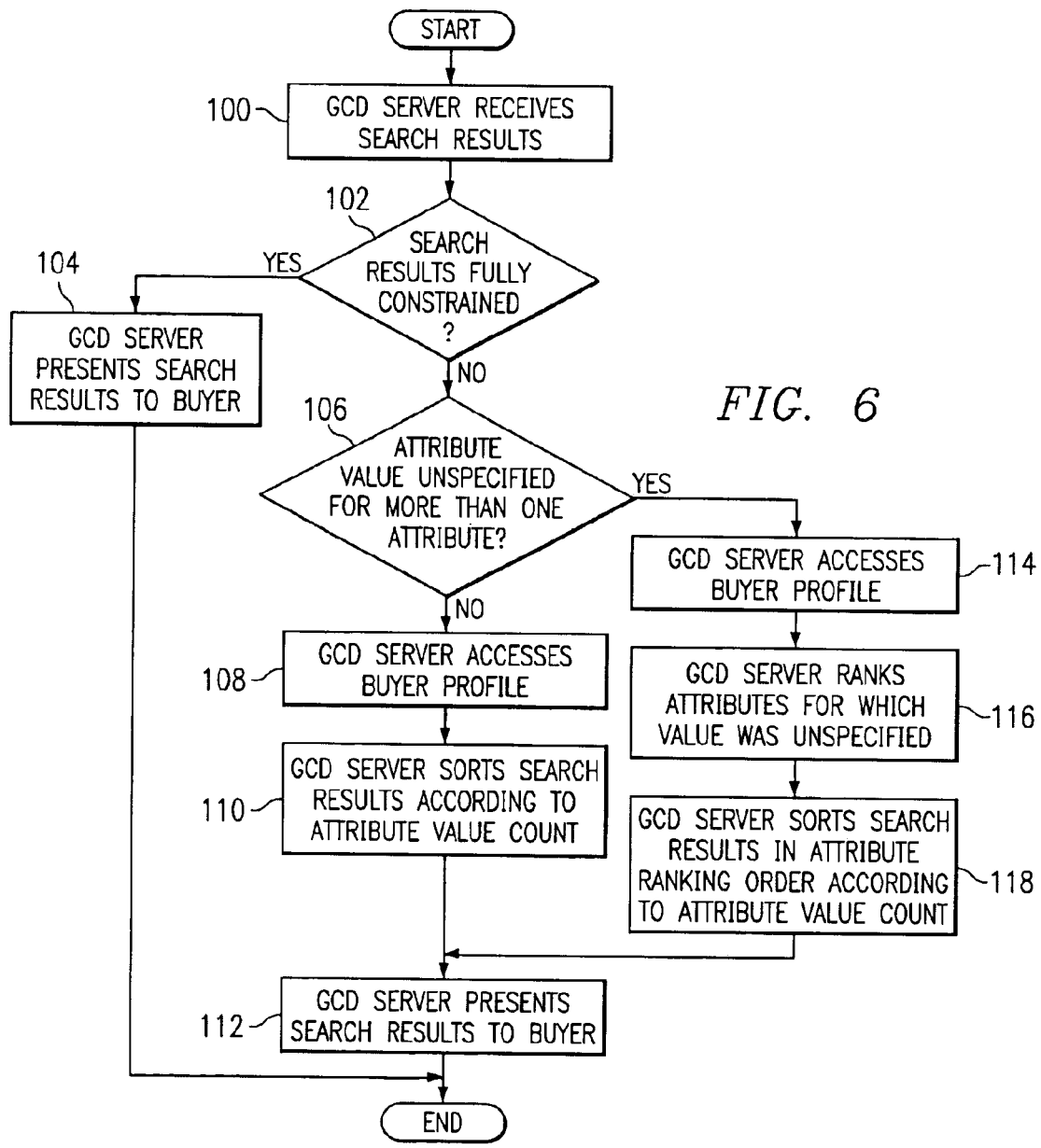
FIG. 6 illustrates an example method for sorting search results according to a buyer profile.

FIG. 6 illustrates an example method for sorting search results according to a buyer profile. The method begins at step 100, where GCD interface 43 receives search results from seller databases 32 in response to a search query communicated by search interface 45. At step 102, one or more components associated with GCD interface 43 determine whether the search results are fully-constrained. As described above, search results may be under-constrained when an exact value has not been specified in the search query for one or more attributes associated with the search results. If the search results are fully-constrained, GCD interface 43 presents the search results to buyer 20 at step 104 without sorting the search results, and the method ends. If the search results are not fully-constrained, GCD interface 43 determines, at step 106, whether an attribute value was unspecified for more than one attribute. If an exact attribute value was not specified for only one attribute, GCD interface 43 accesses buyer profile 47 for buyer 20 at step 108 and sorts the search results according to one or more attribute value counts for the under-constrained attribute at step 110. As described above, GCD interface 43 may access a column 66 corresponding to that attribute in the appropriate table in buyer profile 47 for buyer 20 to determine the count for each attribute value associated with a returned search result. Products matching the attribute value having the highest count may be listed first, products matching the attribute value having the next highest count may be listed second, and so on. At step 112, GCD interface 43 presents the sorted search results to buyer 20, and the method ends.

If exact attribute values were not specified for more than one attribute, GCD interface 43 accesses buyer profile 47 for buyer 20 at step 114 and ranks the under-constrained attributes. As described above, GCD interface 43 may rank these attributes according to the count for the leading attribute value for each attribute to be ranked. Alternatively, GCD interface 43 may rank these attributes according to the count for each attribute. At step 118, GCD interface 43 sorts search results in attribute ranking order according to attribute value count. In one embodiment, as described above, GCD interface 43 may sort search results first by the lowest ranking attribute, then by the next lowest ranking attribute, and so on, such that the search results are listed first by the highest ranking attribute, then by the next highest ranking attribute, and so on. GCD interface 43 may sort search results according to attribute value counts as described above with reference to step 110. At step 112, GCD interface 43 presents the sorted search results to buyer 20, and the method ends.

Although the present invention has been described with several embodiments, divers changes, substitutions, variations, alterations, and modifications may be suggested to one skilled in the art, and it is intended that the invention encompass all such changes, substitutions, variations, alterations, and modifications falling within the spirit and scope of the appended claims.

What is claimed is:

1. A system for sorting search results according to a buyer profile during the matching phase of an electronic commerce transaction, comprising:

a database containing a buyer profile associated with a buyer, the buyer profile comprising a record of the number of times each of a plurality of sort criteria has appeared in at least some previous events involving the buyer; and a server operable to:

receive a plurality of search results communicated from one or more seller databases in response to an under-constrained search query in which exact attribute values are not specified for one or more attributes;

access the buyer profile to determine an order of display based on the number of times one or more sort criteria in the buyer profile applicable to the search results have appeared in the previous events involving the buyer;

sort the search results according to the determined order of display; and communicate the sorted search results to the buyer; the server further operable to:

delete a record for a sort criterion from the buyer profile if the sort criterion has not appeared within a predetermined period of time or within a specified number of recent events;

notify the buyer before deleting the sort criterion; and not delete the sort criterion if the buyer indicates the sort criterion should not be deleted.

2. The system of claim 1, wherein an attribute value is selected from the group consisting of a product attribute value and a seller attribute value.

3. The system of claim 1, wherein a sort criterion is selected from the group consisting of a product attribute, a product attribute value, a seller attribute, and a seller attribute value.

4. The system of claim 1, wherein an event is selected from the group consisting of a search query, a sort request, and a search result selection.

5. The system of claim 1, wherein the server is operable to determine the order of display according to the number of times each of a plurality of attribute values has appeared in events involving the buyer.

6. The system of claim 1, wherein the sewer is operable to determine the order of display according to the number of times each of a plurality of attributes has appeared in events involving the buyer.

7. The system of claim 1, wherein the buyer profile comprises a record of the number of times each of a plurality of sort criteria has appeared in a specified number of recent events involving the buyer.

8. The system of claim 1, wherein the search query is under-constrained in that no attribute values are specified for one or more attributes.

9. A method of sorting search results according to a buyer profile during the matching phase of an electronic commerce transaction, comprising:

receiving a plurality of search results communicated from one or more seller databases in response to an under-constrained search query in which exact attribute values are not specified for one or more attributes;

accessing a buyer profile associated with a buyer, the buyer profile comprising a record of the number of times each of a plurality of sort criteria has appeared in at least some previous events involving the buyer;

determining an order of display based on the number of times one or more sort criteria in the buyer profile applicable to the search results have appeared in the previous events involving the buyer;

sorting the search results according to the determined order of display;

communicating the sorted search results to the buyer;

determining that a sort criterion has not appeared within a predetermined period of time or within a specified number of recent events;

notifying the buyer that the record for the sort criterion may be deleted;

deleting the sort criterion if the buyer indicates the sort criterion be deleted; and not deleting the sort criterion if the buyer indicates the sort criterion should not be deleted.

10. The method of claim 9, wherein an attribute value is selected from the group consisting of a product attribute value and a seller attribute value.

11. The method of claim 9, wherein a sort criterion is selected from the group consisting of a product attribute, a product attribute value, a seller attribute, and a seller attribute value.

12. The method of claim 9, wherein an event is selected from the group consisting of a search query, a sort request, and a search result selection.

13. The method of claim 9, wherein the determined order of display is based on the number of times each of a plurality of attribute values has appeared in events involving the buyer.

14. The method of claim 9, wherein the determined order of display is based on the number of times each of a plurality of attributes has appeared in events involving the buyer.

15. The method of claim 9, wherein the buyer profile comprises a record of the number of times each of a plurality of sort criteria has appeared in a specified number of recent events involving the buyer.

16. The method of claim 9, further comprising deleting a record for a sort criterion from the buyer profile if the sort criterion has not appeared within a predetermined period of time or within a specified number of recent events.

17. The method of claim 9, wherein the search query is under-constrained in that no attribute values are specified for one or more attributes.

18. Software for sorting search results according to a buyer profile during the matching phase of an electronic commerce transaction, the software embodied in a computer-readable medium and when executed operable to:

receive a plurality of search results communicated from one or more seller databases in response to an under-constrained search query in which exact attribute values are not specified for one or more attributes;

access a buyer profile associated with a buyer, the buyer profile comprising a record of the number of times each of a plurality of sort criteria has appeared in at least some previous events involving the buyer;

determine an order of display based on the number of times one or more sort criteria in the buyer profile applicable to the search results have appeared in the previous events involving the buyer;

sort the search results according to the determined order of display;

communicate the sorted search results to the buyer;

notify the buyer before deleting the sort criterion; and not delete the sort criterion if the buyer indicates the sort criterion should not be deleted.

19. The software of claim 18, wherein an attribute value is selected from the group consisting of a product attribute value and a seller attribute value.

20. The software of claim 18, wherein a sort criterion is selected from the group consisting of a product attribute, a product attribute value, a seller attribute, and a seller attribute value.

21. The software of claim 18, wherein an event is selected from the group consisting of a search query, a sort request, and a search result selection.

22. The software of claim 18, wherein the determined order of display is based on the number of times each of a plurality of attribute values has appeared in events involving the buyer.

23. The software of claim 18, wherein the determined order of display is based on the number of times each of a plurality of attributes has appeared in events involving the buyer.

24. The software of claim 18, wherein the buyer profile comprises a record of the number of times each of a plurality of sort criteria has appeared in a specified number of recent events involving the buyer.

25. The software of claim 18, further operable to delete the record for the sort criterion from the buyer profile if the sort criterion has not appeared within a predetermined period of time or within a specified number of recent events.

26. The software of claim 18, wherein the search query is under-constrained in that no attribute values are specified for one or more attributes.

* * * * *